United States Patent
Galtier

(10) Patent No.: US 7,839,884 B2
(45) Date of Patent: Nov. 23, 2010

(54) METHOD AND DEVICE FOR RESOLVING COLLISION IN A WIRELESS TELECOMMUNICATIONS NETWORK

(75) Inventor: Jérôme Galtier, Nice (FR)

(73) Assignee: France Telecom, Paris (FR)

( * ) Notice: Subject to any disclaimer, the term of this patent is extended or adjusted under 35 U.S.C. 154(b) by 48 days.

(21) Appl. No.: 12/084,612

(22) PCT Filed: Nov. 2, 2006

(86) PCT No.: PCT/FR2006/051130
§ 371 (c)(1),
(2), (4) Date: May 5, 2008

(87) PCT Pub. No.: WO2007/051946
PCT Pub. Date: May 10, 2007

(65) Prior Publication Data
US 2009/0109993 A1  Apr. 30, 2009

(30) Foreign Application Priority Data
Nov. 4, 2005  (FR) .................................. 05 11267

(51) Int. Cl.
*H04B 7/212* (2006.01)
(52) U.S. Cl. ......................... 370/444; 370/462
(58) Field of Classification Search ............... None
See application file for complete search history.

(56) References Cited

U.S. PATENT DOCUMENTS

| | | | | |
|---|---|---|---|---|
| 7,586,932 B2* | 9/2009 | Chou et al. | .................. | 370/445 |
| 7,606,257 B2* | 10/2009 | Barratt et al. | ................ | 370/445 |
| 2004/0093421 A1* | 5/2004 | Peng et al. | ................... | 709/232 |
| 2004/0264423 A1* | 12/2004 | Ginzburg et al. | ............ | 370/338 |

OTHER PUBLICATIONS

Z.G. Abichar et al., "CONTI: Constant-Time Contention Resolution for WLAN Access", Networking 2005: 4th International IFIP-TC6 Networking Conference, vol. 3462/2005, pp. 358-369, May 6, 2005 http://www.springerlink.com/media/dlteumlulp4y0qgunm13/contributions/1/p/0/d/lp0df71kxhclt688.pdf>.

* cited by examiner

*Primary Examiner*—Phuc Tran
(74) *Attorney, Agent, or Firm*—Cohen Pontani Lieberman & Pavane LLP

(57) ABSTRACT

A contention resolution system and method are disclosed that can be used in a station having a data packet to send in a wireless telecommunications network. After a predetermined maximum number of selection rounds, it is determined whether the station is authorized to send the packet. In each of the rounds, a value of a binary random variable is drawn, which represents authorization or prohibition, to send the packet during the round. The probability of the binary random variable value assuming a predetermined value is adjusted taking into account authorizations and prohibitions to send the packet obtained by the station during preceding selection rounds.

13 Claims, 5 Drawing Sheets

METHOD AND DEVICE FOR RESOLVING COLLISION IN A WIRELESS TELECOMMUNICATIONS NETWORK

RELATED APPLICATIONS

This is a U.S. National Phase Application under 35 USC 371 of International Application PCT/FR2006/051130, filed on Nov. 2, 2006.

This application claims the priority of French application no. 05/11267 filed Nov. 4, 2005, the entire content of which is hereby incorporated by reference.

BACKGROUND OF THE INVENTION

The present invention relates to wireless telecommunications networks, in particular wireless local access networks (WLAN) conforming to the IEEE 802.11 family of standards.

Such networks are also known as Wi-Fi networks. In many applications they are used to network stations (for example computers, personal digital assistants, and peripherals).

In the document "IEEE 802.11a-1999, IEEE 802.11b-1999, IEEE 802.11d-2001, Part 11: wireless LAN medium access control (MAC) and physical layer (PHY) specifications" the 802.11 standard defines a wireless network traffic regulation method that uses a system of congestion windows (CW) to regulate traffic. According to that standard, in order to determine the time at which to send a data packet, a station draws by chance a random number between 0 and CW−1, the value CW being an integer between two values $CW_{min}$ and $CW_{max}$ specified by the 802.11 standard.

This value CW is counted down to send the packet, the countdown being delayed if the station determines that another station is in the process of sending. Unfortunately, that system using congestion windows causes a large number of collisions in the wireless network, which from the user's point of view are reflected in a great loss of bandwidth.

The document by Z. Abichar and M. Chang, "CONTI: Constant Time Contention Resolution for WLAN Access", IFIP Networking 2005, below referred to as [CONTI], proposes a constant time contention resolution method that uses a series of successive very short tests to select the station that is going to send.

According to the CONTI method, stations seeking to send are eliminated using a try-bit Boolean variable. To be more precise, each station chooses this variable randomly and sends a signal over the network if the random value is equal to 1, or if not listens to the network. A station withdraws from the network, i.e. decides not to send its data packet during a series of selection rounds, if the binary value is equal to 0 and it detects a signal sent by the other stations.

Although offering better performance than the congestion method defined by the 802.11 standard, the proposed CONTI contention resolution method still causes a high number of collisions in the wireless access network, of the order of 5%.

That problem is caused by the fact that the law of probabilities used for drawing the try-bit random variable is not optimized.

OBJECT AND SUMMARY OF THE INVENTION

One object of the present invention is to reduce considerably the collisions caused by the CONTI method, by around 15% to 20%, by improving the law of probabilities used for drawing the aforementioned binary random value.

One aspect of the invention is directed to a contention resolution method that can be used in a station having a data packet to send in a wireless telecommunications network, in which method the packet is sent after a predetermined maximum number of selection rounds preceding sending.

This method includes, on each of the selection rounds, a step of drawing a value of a binary random variable representing authorization or prohibition to send the packet during that round.

The probability $p_w$ of said binary random variable value assuming a predetermined value is adjusted taking into account authorizations and prohibitions to send the packet obtained by the station during preceding selection rounds.

In practice, this resolution method is used simultaneously by a plurality of stations seeking to send a packet in the network. The aforementioned probabilities are adjusted by a mathematical optimization method taking the number of stations into account, which has the advantage of significantly reducing the number of collisions in the wireless telecommunications network compared to prior art contention resolution methods.

In one implementation these probabilities are obtained from the following formula:

$$p_w = \frac{z_{\#(w)2^{kmax-l(w)}+2^{kmax-l(w)}-1} - z_{\#(w)2^{kmax-l(w)}+2^{kmax-l(w)}}}{z_{\#(w)2^{kmax-l(w)}} - z_{\#(w)2^{kmax-l(w)}+2^{kmax-l(w)}}}$$

where:
  $\underline{w}$ represents a binary word $(r(1), \ldots, r(k-1))$ of binary numeric value $\#(w)$ and wherein the binary value of a rank (i) is equal to said value of the binary random variable $(r(i))$ drawn on the selection round (i) corresponding to that rank, $l(w)$ being the length of the word $\underline{w}$;

the values $z_i$ being chosen so that:
  $z_0=0$; $z_m=1$; $0<z_i<z_{i+1}<1$, for $1 \leq i \leq m-2$, where $m=2^{kmax}$, kmax being said number of selection rounds, and such that there exists a positive "density function" $\underline{h}$ that is normalized between 0 and 1, such that:

$$\int_{zi}^{zi+1} h(t)\,dt = \frac{1}{m}\int_0^1 h(t)\,dt$$

This method greatly reduces the number of collisions compared to the prior art CONTI method, as shown below with reference to FIG. 7.

In one implementation, the resolution method of the invention includes a step of defining a scenario consisting in fixing probabilities of a number of stations seeking to send a packet during the same selection round, those stations being referred to as "eligible", and the value of the density function in the vicinity of 1 is greater the more those probabilities are non-negligible for high values of that number.

In one implementation a characteristic function $\underline{f}$ of the distribution of the number of eligible stations is defined and the density function $\underline{h}$ is defined so that it increases with the inflection of the characteristic function.

FIG. 1, which shows the derivative f' of the characteristic function $\underline{f}$ in the range [0, 1], explains this choice. It can be shown that the collision rate corresponds to the shaded area between the graphical representation of the curve f' and its approximation by a Riemann integral.

Consequently, minimizing the collision rate amounts to minimizing this area, namely determining, for a given number of Riemann steps, the position of those Riemann steps (i.e. the points $z_i$) that define the best approximation of f'.

Because of the shape of the representation of the function f', it is preferable to choose points $z_i$ from the range [0, 1] concentrated in the vicinity of 1. This amounts precisely to choosing a function h increasing with the inflection of the characteristic function f, conforming to the following normalization constraint:

$$\int_0^1 h(t)\,dt = 1$$

The density step function h can be defined on the basis of the points $z_i$ as follows, for $z_i \leq x < z_{i+1}$:

$$h(x) = \frac{1}{m(z_{i+1} - z_i)},$$

Under these conditions, minimizing the collision rate amounts to minimizing the integral between 0 and 1 of the function that associates x with f''(x)/h(x), where f'', represents the second derivative of the characteristic function f.

The density function h that would minimize the aforementioned integral if h were a continuous function and not a step function is preferably defined as follows:

$$h(x) = \sqrt{f''(x)} * \frac{1}{\int_0^1 \sqrt{f''(t)}\,dt}$$

In one implementation, to obtain the values $z_j$:
a function H is defined as follows:

$$\begin{cases} H(0) = 0 \\ H(i+1) = H(i) + h\left(\frac{i+1/2}{M}\right) \end{cases}$$

where M is a number very much greater than m and $z_j$ is defined as follows for $0 \leq j \leq m$:

$$\begin{cases} z_0 = 0 \\ z_j = \frac{1}{M}\min\left\{i \,/\, \frac{H(i)}{H(M-1)} \geq \frac{j}{m}\right\} \\ z_m = 1 \end{cases}$$

This choice of values $z_i$ approximates the step function h defined above as closely as possible.

In one implementation, during the scenario definition step, the probabilities $k_n$ of a number n of stations seeking to send a packet during the same selection term are fixed as follows:
$k_n = 1/S$ for $1 \leq n \leq S$; and
$k_n = 0$ for $n > S$, where S is the planned number of stations in the network.

This feature has the advantage of sizing the contention resolution method of a given number of stations.

The number S is chosen as equal to 100, for example.

In one implementation, the steps of the contention resolution method are determined by computer program instructions.

Another aspect of the invention is directed to a computer program on an information medium, adapted to be executed in a station, or more generally in a computer, and including instructions for executing the steps of a resolution method as described above.

This program can use any programming language and take the form of source code, object code or a code that is intermediate between source code and object code, such as a partially compiled form, or any other desirable form.

Another aspect of the invention is directed to a computer-readable information medium containing instructions of the above computer program.

The information medium can be any entity or device capable of storing the program. For example, the medium can include storage means such as a ROM, for example a CD-ROM or a microelectronic circuit ROM, or magnetic storage means, for example a diskette (floppy disk) or a hard disk.

Furthermore, the information medium can be a transmissible medium such as an electrical or optical signal which can be routed via an electrical or optical cable, by radio or by other means. The program of the invention can in particular be downloaded over an Internet type network.

Alternatively, the information medium can be an integrated circuit incorporating the program and adapted to execute the method in question or to be used in its execution.

Another aspect of the invention is directed to a contention resolution device that can be incorporated into a station having a data packet to send in a wireless telecommunications network. This device includes:

means for sending said packet after a predetermined maximum number of selection rounds preceding sending; and means for drawing, in each of the selection rounds, a value of a binary random variable representing an authorization or a prohibition to send said packet during that round.

The probability $p_w$ of said binary random value assuming a predetermined value is adjusted taking into account authorizations and prohibitions to send the packet obtained by the station during preceding selection rounds.

The probabilities $p_w$ are stored in a table accessible to a device according to the invention and obtained beforehand from the following equation:

$$p_w = \frac{z_{\#(w)2^{kmax-l(w)}+2^{kmax-l(w)-1}} - z_{\#(w)2^{kmax-l(w)}+2^{kmax-l(w)}}}{z_{\#(w)2^{kmax-l(w)}} - z_{\#(w)2^{kmax-l(w)}+2^{kmax-l(w)}}}$$

in which:

w represents a binary word $(r(1), \ldots, r(k-1))$ of binary numeric value #(w) and the binary value of rank (i) is equal to said value of the binary random variable (r(i)) drawn in selection round (i) that corresponds to that rank;

the values $z_i$ being chosen so that:
$z_0=0$; $z_m=1$; $0<z_i<z_{i+1}<1$, for $1 \leq i \leq m-2$, where $m=2^{kmax}$, kmax being said number of selection rounds, and such that there exists a positive "density function" h that is normalized between 0 and 1, such that:

$$\int_{z_i}^{z_{i+1}} h(t)\,dt = \frac{1}{m}\int_0^1 h(t)\,dt$$

The advantages and additional features of the resolution device of the invention are similar to those of the above resolution method and are not repeated here.

BRIEF DESCRIPTION OF THE DRAWINGS

Other features and advantages of the present invention emerge from the description given below with reference to the appended drawings, which illustrate one non-limiting implementation of the invention. In the figures.

DETAILED DESCRIPTION OF THE DRAWINGS

Figure 1:
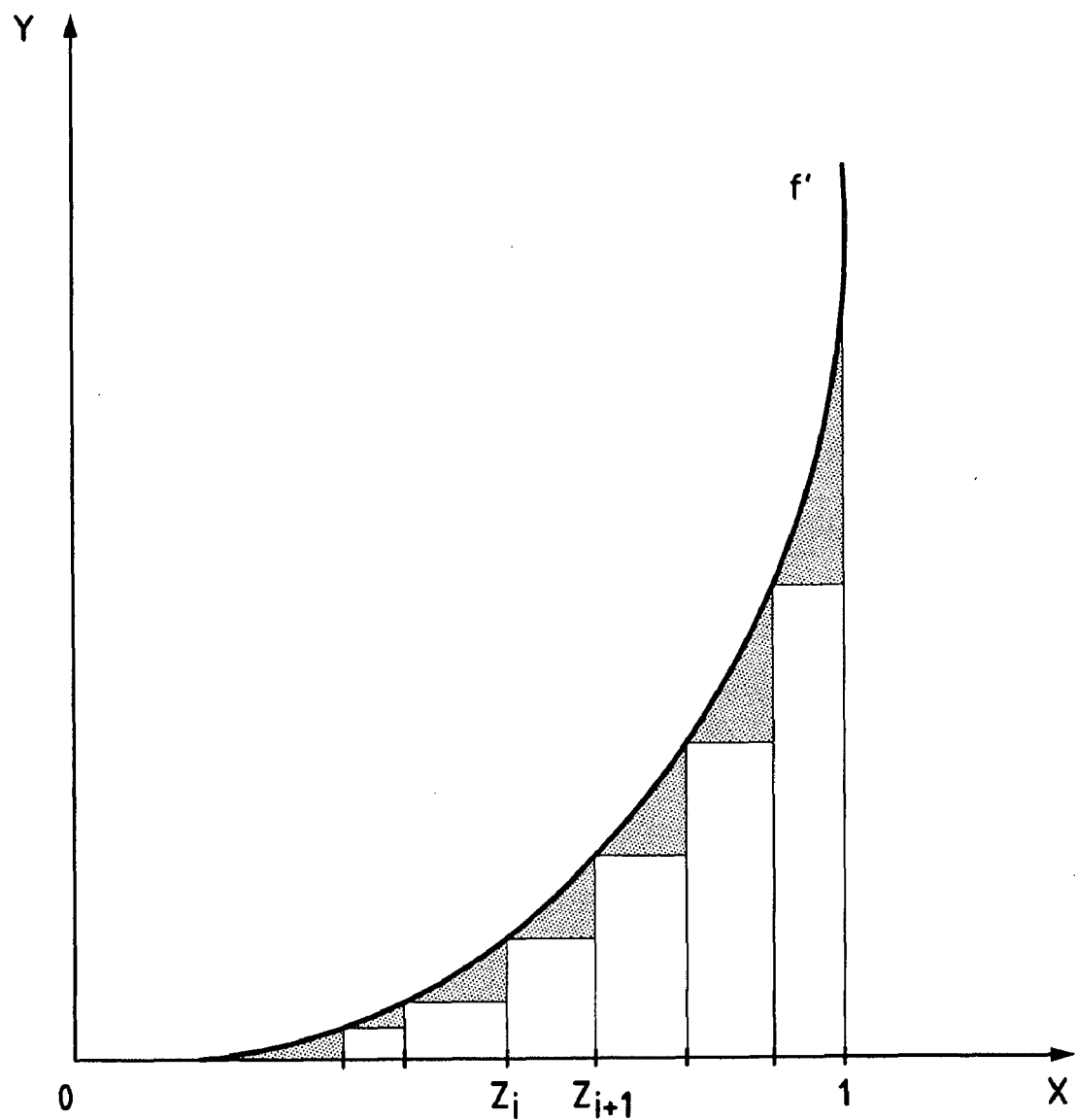
FIG. 1, described above, shows the derivative of the characteristic function $\underline{f}$ in the range [0, 1]
Figure 2:
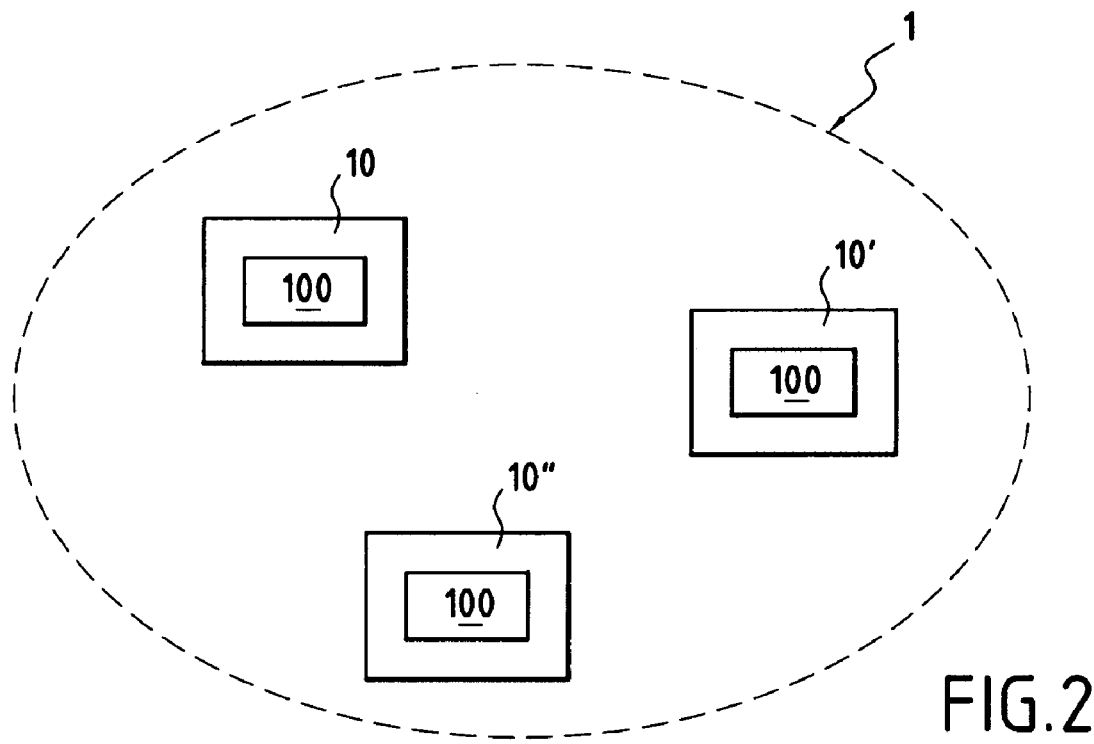
FIG. 2 shows a wireless telecommunications network with a preferred implementation of stations according to the invention.

FIG. 2 shows a wireless telecommunications network 1 used by stations 10, 10', 10" of the invention.

Figure 3:
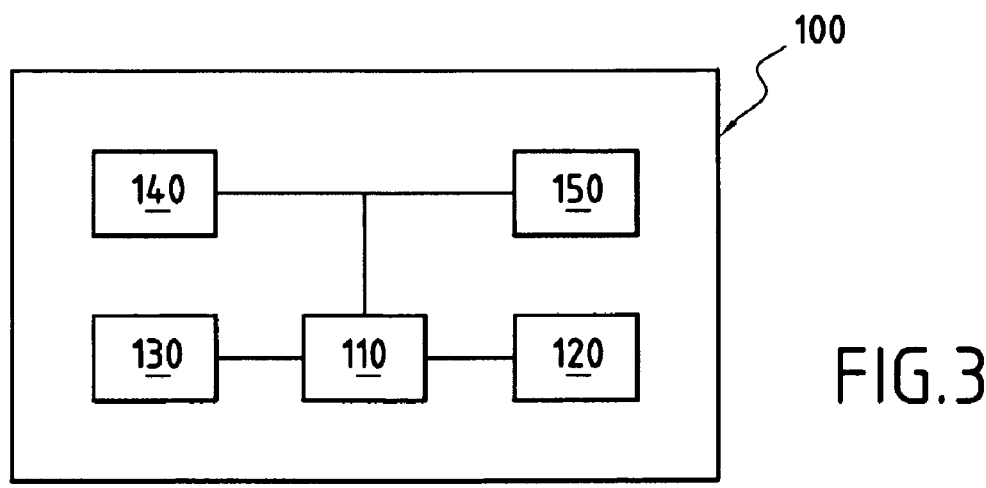
FIG. 3 shows a preferred embodiment of a contention resolution device of the invention.

Each of these stations 10 includes a contention resolution device of the invention, described below with reference to FIG. 3.

In the preferred implementation described here, the contention resolution device 100 includes a processor 110, a random-access memory (RAM) 120, a read-only memory (ROM) 130, means 140 for sending and receiving packets and signals in the wireless telecommunications network 1, and a table of probabilities 150.

These elements are interconnected by a bus system (no reference number).

In the example described here, the means 140 for sending and receiving data packets and signals over the wireless telecommunications network 1 consist of a card conforming to the IEEE 802.11 family of standards.

Figure 4:
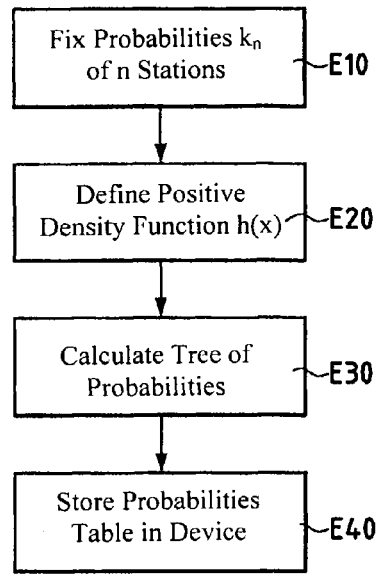
FIG. 4 is a flowchart showing the main steps of a preferred implementation of a method of the invention for obtaining a table of probabilities.

A method of obtaining the table of probabilities 150 is described below with reference to FIG. 4.

During a first step E10, a scenario is defined that fixes the probabilities $k_n$ of a number $\underline{n}$ of stations seeking to send a packet during the same selection round.

In the preferred implementation described here, these probabilities $k_n$ are defined as follows:

$k_n = 1/S$ for $1 \leq n \leq S$; and $k_n = 0$ for $n > S$, where S is the planned number of stations in the network.

The number S is made equal to 100, for example.

A positive density function $\underline{h}$ increasing between 0 and 1 is defined during a step E20.

In the preferred implementation described here, this density function $\underline{h}$ is defined as follows:

$$h(x) = \sqrt{f''(x)}$$

where f'' represents the second derivative of a characteristic function $\underline{f}$ of the distribution of the number of the aforementioned eligible stations.

This function $\underline{f}$ can be chosen in the form:

$$f(x) = \sum_{n \geq 1} k_n x^n.$$

Then, during a step E30, a tree of probabilities is calculated as follows:

Firstly, a function H is defined:

$$\begin{cases} H(0) = 0 \\ H(i+1) = H(i) + h\left(\frac{i+1/2}{M}\right) \end{cases}$$

where M is a number very much greater than $\underline{m}$ and $z_j$ is defined for $0 \leq j \leq m$ as follows:

$$\begin{cases} z_0 = 0 \\ z_j = \frac{1}{M}\min\left\{i \,/\, \frac{H(i)}{H(M-1)} \geq \frac{j}{m}\right\} \\ z_m = 1 \end{cases}$$

It is possible to verify that the series of $z_i$ defined in this way is such that:

$$\int_{z_i}^{z_{i+1}} h(t)\,dt = \frac{1}{m}\int_0^1 h(t)\,dt$$

The probabilities $p_w$ are then calculated using the following formula:

$$p_w = \frac{z_{\#(w)2^{kmax-l(w)}+2^{kmax-l(w)}-1} - z_{\#(w)2^{kmax-l(w)}+2^{kmax-l(w)}}}{z_{\#(w)2^{kmax-l(w)}} - z_{\#(w)2^{kmax-l(w)}+2^{kmax-l(w)}}}$$

in which:

$\underline{w}$ is a word in the alphabet {0, 1} in which a "1" of rank $\underline{i}$, respectively a "0" of rank $\underline{i}$, represents the fact that said station has sent, respectively has not sent, said signal in the selection round $\underline{i}$;

(w) represents the numerical value represented by $\underline{w}$; and
l(w) represents the length of the word $\underline{w}$.

Table 1 below represents the probabilities obtained using this implementation of the invention.

TABLE 1

| | |
|---|---|
| p | 0.08 |
| $p_1$ | 0.34 |
| $p_0$ | 0.17 |
| $p_{11}$ | 0.44 |
| $p_{10}$ | 0.40 |
| $p_{01}$ | 0.34 |
| $p_{00}$ | 0.28 |
| $p_{111}$ | 0.47 |
| $p_{110}$ | 0.47 |
| $p_{101}$ | 0.46 |
| $p_{100}$ | 0.44 |

TABLE 1-continued

| | |
|---|---|
| $p_{011}$ | 0.43 |
| $p_{010}$ | 0.42 |
| $p_{001}$ | 0.41 |
| $p_{000}$ | 0.36 |
| $p_{1111}$ | 0.49 |
| $p_{1110}$ | 0.48 |
| $p_{1101}$ | 0.49 |
| $p_{1100}$ | 0.48 |
| $p_{1011}$ | 0.48 |
| $p_{1010}$ | 0.48 |
| $p_{1001}$ | 0.47 |
| $p_{1000}$ | 0.47 |
| $p_{0111}$ | 0.46 |
| $p_{0110}$ | 0.46 |
| $p_{0101}$ | 0.46 |
| $p_{0100}$ | 0.46 |
| $p_{0011}$ | 0.46 |
| $p_{0010}$ | 0.45 |
| $p_{0001}$ | 0.44 |
| $p_{0000}$ | 0.42 |
| $p_{11111}$ | 0.49 |
| $p_{11110}$ | 0.49 |
| $p_{11101}$ | 0.49 |
| $p_{11100}$ | 0.50 |
| $p_{11011}$ | 0.49 |
| $p_{11010}$ | 0.49 |
| $p_{11001}$ | 0.49 |
| $p_{11000}$ | 0.49 |
| $p_{10111}$ | 0.49 |
| $p_{10110}$ | 0.49 |
| $p_{10101}$ | 0.49 |
| $p_{10100}$ | 0.49 |
| $p_{10011}$ | 0.49 |
| $p_{10010}$ | 0.49 |
| $p_{10001}$ | 0.48 |
| $p_{10000}$ | 0.48 |
| $p_{01111}$ | 0.48 |
| $p_{01110}$ | 0.48 |
| $p_{01101}$ | 0.48 |
| $p_{01100}$ | 0.48 |
| $p_{01011}$ | 0.48 |
| $p_{01010}$ | 0.48 |
| $p_{01001}$ | 0.48 |
| $p_{01000}$ | 0.48 |
| $p_{00111}$ | 0.48 |
| $p_{00110}$ | 0.48 |
| $p_{00101}$ | 0.48 |
| $p_{00100}$ | 0.47 |
| $p_{00011}$ | 0.47 |
| $p_{00010}$ | 0.47 |
| $p_{00001}$ | 0.46 |
| $p_{00000}$ | 0.46 |

Figure 6:
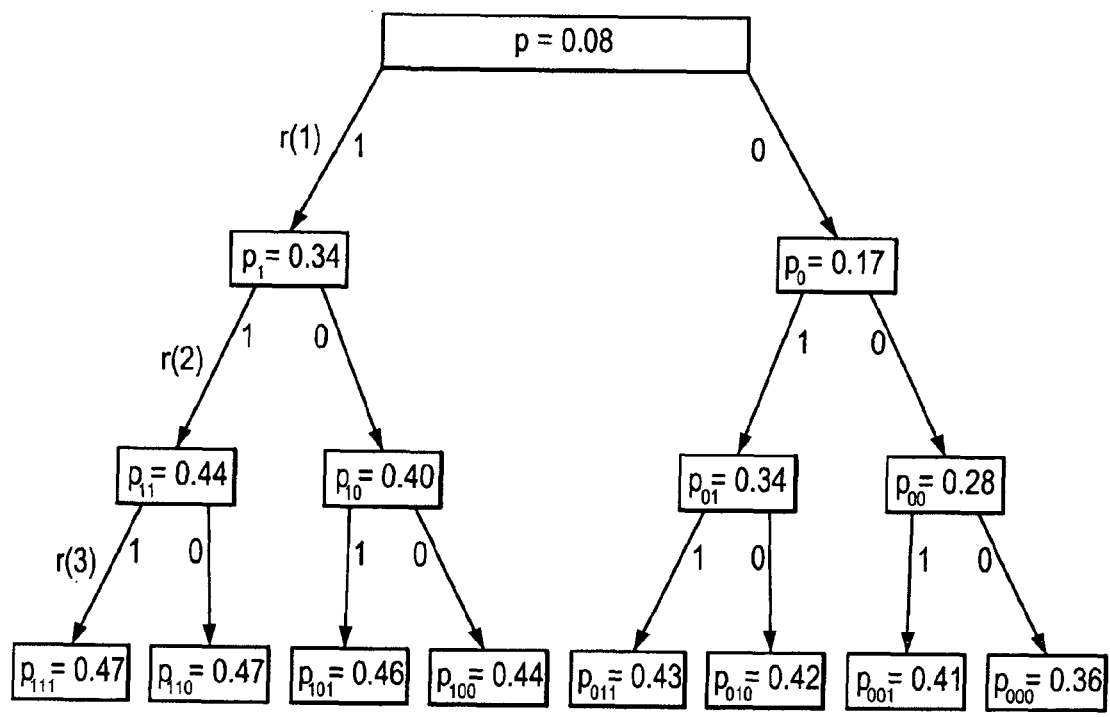
FIG. 6 shows a tree of probabilities obtained by a contention resolution method of the invention.

FIG. 6 shows this table in the form of a tree for the first three selection rounds. This table should be read as follows:

the first probability $p$ represents the probability of a station sending in the first selection round and is the same for all stations;

the probability $p_1$ represents the probability of drawing the value "1" for the binary random variable $r(k)$ on the second selection round given that a value "1" was drawn on the first selection round;

the probability $p_0$ represents the probability of drawing the value "1" for the binary random variable $r(k)$ on the second selection round given that a value "0" was drawn on the first selection round; and the probability $p_w$ represents the probability of drawing the value "1" for the binary random variable $r(k)$ in the $k^{th}$ selection round given that the values $r(1)r(2)r(k-1)$ defining the index $w$ were drawn in the preceding selection round(s).

This table 1 is stored in the table 150 of the contention resolution device 100 of the invention.

Figure 5:
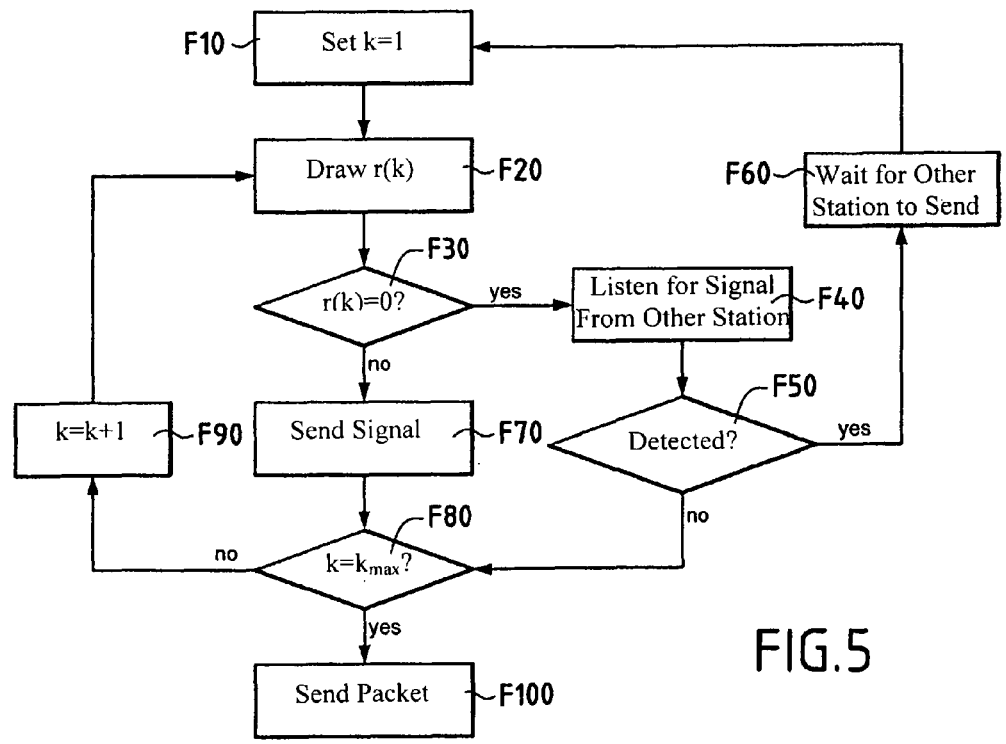
FIG. 5 is a flowchart showing the main steps of a preferred implementation of a contention resolution method of the invention.

The main steps of a contention resolution method of the invention are described next with reference to FIG. 5. It is assumed that this method is implemented by the station 10, which is seeking to send a data packet in the network 1.

During a first step F10, a variable $k$ representing the current selection round is initialized to 1.

This initialization step F10 is followed by a step F20 of drawing a value of a binary random variable $r(k)$.

According to the invention, the probability of this binary random variable $r(k)$ taking the predetermined value "1" on round $k$ is equal to the probability $p[r(1), r(2), \ldots r(k-1)]$ read in the table 150.

This step F20 of drawing a random variable value is followed by a step F30 which verifies whether the binary value $r(k)$ drawn is equal to 0.

If so, this test F30 is followed by a step F40 during which the station 10 listens to the wireless telecommunications network to determine if another station 10', 10" has sent a signal representing the fact that the other station 10', 10" is seeking to send a data packet.

If that signal is detected (result of test F50 positive), the contention resolution method terminates during a step F60 without the station 10 sending its data packet. During this step F60, the station 10 awaits the end of the rounds of selection and sending of a packet by another station 10', 10" before returning to the initialization step F10 already described.

Otherwise, if the signal is not detected (result of test F50 negative), this test is followed by a test F80 which determines whether the round $k$ is the last selection round, which amounts to verifying whether the variable $k$ is equal to kmax.

If so, the station 100 sends its data packet during a step F100.

Otherwise, if $k$ is strictly less than kmax, the result of the test F80 is negative. That test is then followed by a step F90 during which the variable $k$ is incremented by one unit.

This incrementation step F90 is followed by the step F20, already described, of drawing a value of a binary random variable $r(k)$ for the next selection round.

If it is determined during the test F30 that the binary value drawn is equal to the predetermined value 1, this test F30 is followed by a step F70 of sending a signal representing the fact that the station 100 is seeking to send a data packet over the network.

This step F70 of sending a signal is followed by the test F80 already described which verifies whether the current selection round $k$ is the last selection round.

If this is so, this test F80 is followed by the step F100 of the station 10 sending the data packet.

Otherwise, if this is not so, the test F80 is followed by the incrementation step F90 already described.

Consider for example table 2, using the notation of the invention, giving the probabilities of sending a data packet by the prior art CONTI method.

TABLE 2

| | |
|---|---|
| $p$ | 0.07 |
| $p_1$ | 0.2 |
| $p_0$ | 0.2 |
| $p_{11}$ | 0.25 |
| $p_{10}$ | 0.25 |
| $p_{01}$ | 0.25 |
| $p_{00}$ | 0.25 |
| $p_{111}$ | 0.33 |
| $p_{110}$ | 0.33 |
| $p_{101}$ | 0.33 |
| $p_{100}$ | 0.33 |
| $p_{011}$ | 0.33 |

TABLE 2-continued

| | |
|---|---|
| $p_{0_{10}}$ | 0.33 |
| $p_{0_{01}}$ | 0.33 |
| $p_{0_{00}}$ | 0.33 |
| $p_{1_{1111}}$ | 0.4 |
| $p_{1_{1110}}$ | 0.4 |
| $p_{1_{1101}}$ | 0.4 |
| $p_{1_{1100}}$ | 0.4 |
| $p_{1_{1011}}$ | 0.4 |
| $p_{1_{1010}}$ | 0.4 |
| $p_{1_{1001}}$ | 0.4 |
| $p_{1_{1000}}$ | 0.4 |
| $p_{0_{1111}}$ | 0.4 |
| $p_{0_{1110}}$ | 0.4 |
| $p_{0_{1101}}$ | 0.4 |
| $p_{0_{1100}}$ | 0.4 |
| $p_{0_{1011}}$ | 0.4 |
| $p_{0_{1010}}$ | 0.4 |
| $p_{0_{1001}}$ | 0.4 |
| $p_{0_{1000}}$ | 0.4 |
| $p_{1_{11111}}$ | 0.5 |
| $p_{1_{11110}}$ | 0.5 |
| $p_{1_{11101}}$ | 0.5 |
| $p_{1_{11100}}$ | 0.5 |
| $p_{1_{11011}}$ | 0.5 |
| $p_{1_{11010}}$ | 0.5 |
| $p_{1_{11001}}$ | 0.5 |
| $p_{1_{11000}}$ | 0.5 |
| $p_{1_{10111}}$ | 0.5 |
| $p_{1_{10110}}$ | 0.5 |
| $p_{1_{10101}}$ | 0.5 |
| $p_{1_{10100}}$ | 0.5 |
| $p_{1_{10011}}$ | 0.5 |
| $p_{1_{10010}}$ | 0.5 |
| $p_{1_{10001}}$ | 0.5 |
| $p_{1_{10000}}$ | 0.5 |
| $p_{0_{11111}}$ | 0.5 |
| $p_{0_{11110}}$ | 0.5 |
| $p_{0_{11101}}$ | 0.5 |
| $p_{0_{11100}}$ | 0.5 |
| $p_{0_{11011}}$ | 0.5 |
| $p_{0_{11010}}$ | 0.5 |
| $p_{0_{11001}}$ | 0.5 |
| $p_{0_{11000}}$ | 0.5 |
| $p_{0_{10111}}$ | 0.5 |
| $p_{0_{10110}}$ | 0.5 |
| $p_{0_{10101}}$ | 0.5 |
| $p_{0_{10100}}$ | 0.5 |
| $p_{0_{10011}}$ | 0.5 |
| $p_{0_{10010}}$ | 0.5 |
| $p_{0_{10001}}$ | 0.5 |
| $p_{0_{10000}}$ | 0.5 |
| $p_{0_{01111}}$ | 0.5 |
| $p_{0_{01110}}$ | 0.5 |
| $p_{0_{01101}}$ | 0.5 |
| $p_{0_{01100}}$ | 0.5 |
| $p_{0_{01011}}$ | 0.5 |
| $p_{0_{01010}}$ | 0.5 |
| $p_{0_{01001}}$ | 0.5 |
| $p_{0_{01000}}$ | 0.5 |
| $p_{0_{00111}}$ | 0.5 |
| $p_{0_{00110}}$ | 0.5 |
| $p_{0_{00101}}$ | 0.5 |
| $p_{0_{00100}}$ | 0.5 |
| $p_{0_{00011}}$ | 0.5 |
| $p_{0_{00010}}$ | 0.5 |
| $p_{0_{00001}}$ | 0.5 |
| $p_{0_{00000}}$ | 0.5 |

On the first selection round, the probability p is used, on the second round the probability p[r(1)], on the third round p[r(1), r(2)], and so on. It is therefore clear that on each selection round the index of the probability used contains as many characters as there have been rounds. Note in the table that, according to [CONTI], and in contrast to the invention, the probabilities for a given selection round (i.e. for two indices that have the same number of characters) are identical, and therefore independent of the station and the value drawn for that station during preceding selection rounds.

Figure 7:
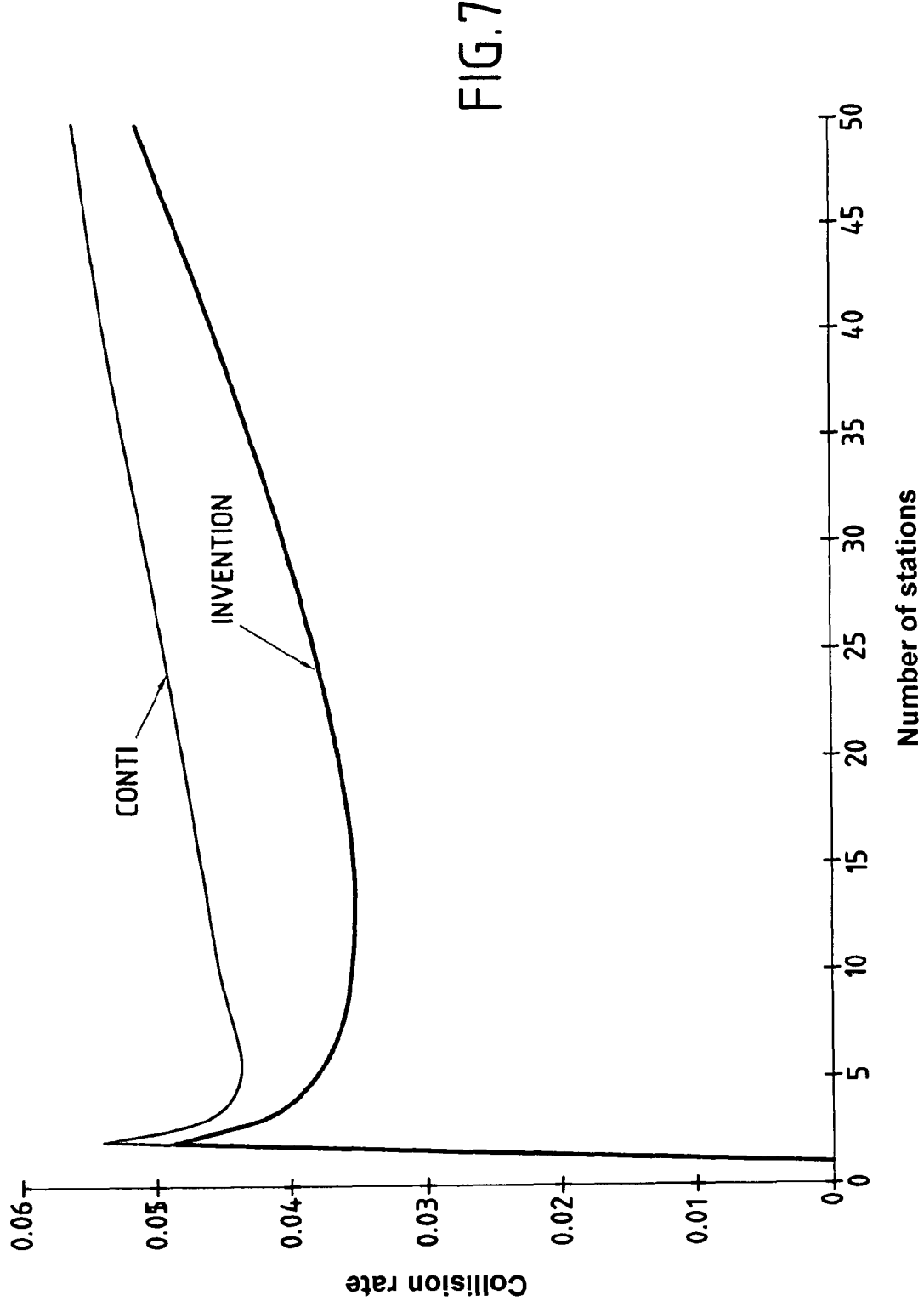
FIG. 7 compares the collision rate obtained by the resolution method of the invention with that obtained by the prior art CONTI method.

FIG. 7 compares the collision rate obtained by the resolution method of the invention with that obtained by the prior art CONTI method, as a function of the number of stations.

Note that the collision rate obtained by the resolution method of the invention (3.5%-5.1%) is lower than that obtained by the CONTI method (4.37%-6.37%).

The contention resolution method and device of the invention therefore reduce the collision rate on the wireless telecommunications network.

The invention claimed is:

1. A contention resolution method that can be used in a station having a data packet to send in a wireless telecommunications network, comprising:
   determining after a predetermined maximum number of selection rounds whether the station is authorized to send the packet, and
   drawing, in each of said selection rounds, a value of a binary random variable representing authorization or prohibition to send the packet during said selection round,
   wherein a probability that said binary random variable value takes a predetermined value is adjusted taking into account authorizations and prohibitions to send the packet obtained by the station during preceding selection rounds.

2. The contention resolution method according to claim 1, wherein said probability is obtained from the following formula:

$$p_w = \frac{z_{\#(w)2^{kmax-l(w)}+2^{kmax-l(w)}-1} - z_{\#(w)2^{kmax-l(w)}+2^{kmax-l(w)}}}{z_{\#(w)2^{kmax-l(w)}} - z_{\#(w)2^{kmax-l(w)}+2^{kmax-l(w)}}}$$

where:
   $\underline{w}$ represents a binary word $(r(1), \ldots, r(k-1))$ of binary numeric value $\#(w)$ and wherein the binary value of a rank (i) is equal to said value of the binary random variable $(r(i))$ drawn on the selection round (i) corresponding to that rank, $l(w)$ being the length of the word $\underline{w}$;
   the values $z_i$ being chosen so that:
   $z_0=0$; $z_m=1$; $0<z_i<z_{i+1}<1$, for $1 \leq i \leq m-2$, where $m=2^{kmax}$, kmax being said number of selection rounds, and such that there exists a positive "density function" $\underline{h}$ that is normalized between 0 and 1, such that:

$$\int_{zi}^{zi+1} h(t)\,dt = \frac{1}{m} \int_0^1 h(t)\,dt.$$

3. The resolution method according to claim 1, comprising a step of defining a scenario consisting in fixing probabilities of a number of stations seeking to send a packet during the same selection round, said stations being referred to as "eligible", and the value of said density function depends on said probabilities.

4. A resolution method according to claim 3, wherein the value of said density function in the vicinity of 1 is greater the more said probabilities are non-negligible for high values of said number.

5. The resolution method according to claim 4, wherein:
   a characteristic function of the distribution of the number of said eligible stations is defined;
   said density function is defined so that it increases with the inflection of said characteristic function.

6. The resolution method according to claim 5, wherein said density function (h) is defined by:

$$h(x) = \sqrt{f''(x)} * \frac{1}{\int_0^1 \sqrt{f''(t)\,dt}}$$

where f" represents the second derivative of said characteristic function (f).

7. The resolution method according to claim 3, wherein, during said scenario definition step, said probabilities of a number of stations seeking to send a packet during the same selection round are fixed as follows:

$k_n = 1/S$ for $1 \leq n \leq S$; and $k_n = 0$ for $n > S$, where S is the planned number of stations in said network.

8. The resolution method according to claim 1, wherein, to obtain values $z_j$:

wherein a function H is defined as follows:

$$\begin{cases} H(0) = 0 \\ H(i+1) = H(i) + h\left(\dfrac{i+1/2}{M}\right) \end{cases}$$

where M is a number very much greater than m and wherein $z_j$ is defined for $0 < j < m$ as follows:

$$\begin{cases} z_0 = 0 \\ z_j = \dfrac{1}{M} \min\left\{i \Big/ \dfrac{H(i)}{H(M-1)} \geq \dfrac{j}{m}\right\} \\ z_m = 1 \end{cases}$$

9. The resolution method according to claim 1, comprising, in each of said selection rounds:

if said drawn binary value is equal to a first predetermined value representing an authorization to send, a step of sending a signal representing the fact that said station is seeking to send a data packet; or if said drawn binary value is equal to a second predetermined value representing a prohibition on sending, a step of listening to said network to determine if another station sent said signal, and where applicable a step of aborting said resolution method without sending said packet.

10. A contention resolution device that can be incorporated into a station having a data packet to send in a wireless telecommunications network, said device including:

means to determine after a predetermined maximum number of selection rounds whether said station is authorized to send said packet; and means for drawing, in each of said rounds, a value of a binary random variable representing an authorization or a prohibition to send said packet during said round;

wherein a probability that said binary random value takes a predetermined value is adjusted taking into account authorizations and prohibitions to send said packet obtained by said station during preceding selection rounds, these probabilities being stored in a table accessible by said device.

11. A station having a data packet to send in a wireless telecommunications network, said station comprising a contention resolution device, said device comprising:

means to determine after a predetermined maximum number of selection rounds whether said station is authorized to send said packet; and means for drawing, in each of said rounds, a value of a binary random variable representing an authorization or a prohibition to send said packet during said round;

wherein a probability that said binary random value takes a predetermined value is adjusted taking into account authorizations and prohibitions to send said packet obtained by said station during preceding selection rounds, these probabilities being stored in a table accessible by said device.

12. A computer program executing on a processor which, when used in a computer, causes the computer to perform a contention resolution method that can be used in a station having a data packet to send in a wireless telecommunications network, the computer program comprising:

code for determining after a predetermined maximum number of selection rounds whether said station is authorized to send said packet, code for drawing a value, in each of said rounds, of a binary random variable representing authorization or prohibition to send said packet during said round, wherein a probability that said binary random variable value takes a predetermined value is adjusted taking into account authorizations and prohibitions to send said packet obtained by said station during preceding selection rounds.

13. A non-transitory computer-readable storage medium for storing an executable program comprising instructions for executing steps of a contention resolution method that can be used in a station having a data packet to send in a wireless telecommunications network, the method comprising:

determining after a predetermined maximum number of selection rounds whether said station is authorized to send said packet, drawing a value, in each of said rounds, of a binary random variable representing authorization or prohibition to send said packet during said round, wherein a probability that said binary random variable value takes a predetermined value is adjusted taking into account authorizations and prohibitions to send said packet obtained by said station during preceding selection rounds.

* * * * *